E. L. MILLS.
SPREADER VALVE AND PIPE FOR OIL DISTRIBUTION.
APPLICATION FILED JULY 6, 1915.
1,191,607.
Patented July 18, 1916.
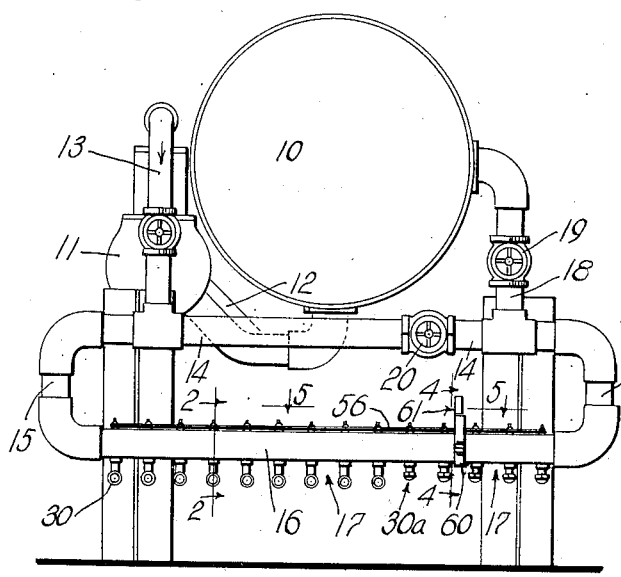
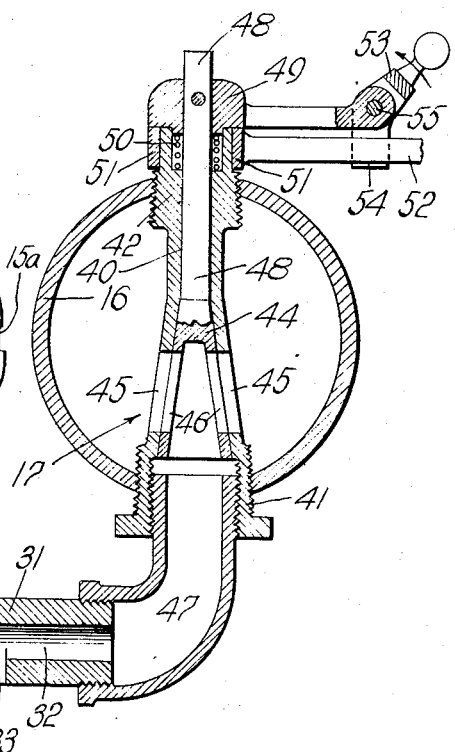
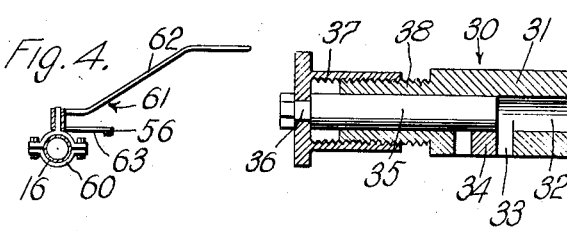
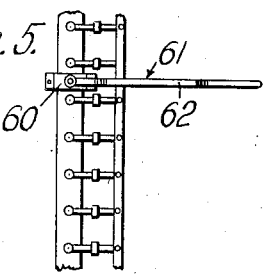
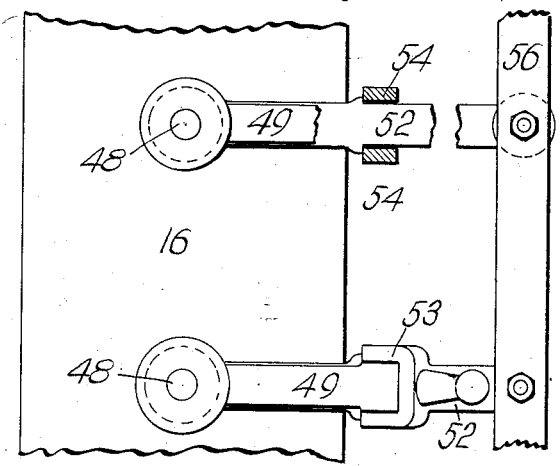
Witness.
Edward H. Barkelew.
Inventor
Edward L. Mills
by James T. Barkelew
his Attorney.

UNITED STATES PATENT OFFICE.

EDWARD L. MILLS, OF LOS ANGELES, CALIFORNIA.

SPREADER VALVE AND PIPE FOR OIL DISTRIBUTION.

1,191,607.

Specification of Letters Patent. Patented July 18, 1916.

Application filed July 6, 1915. Serial No. 38,077.

*To all whom it may concern:*

Be it known that I, EDWARD L. MILLS, a citizen of the United States, residing at Los Angeles, in the county of Los Angeles, State of California, have invented new and useful Improvements in Spreader Valves and Pipes for Oil Distribution, of which the following is a specification.

This invention relates to devices for distributing and spreading oil for application to roads and the like; and the invention comprises certain improvements in the valve mechanism for distributing and discharging the oil.

My invention is more particularly adapted to road oiling devices in which heated oil containing a large percentage of asphalt is distributed, and to such road oiling devices that have means for circulating the hot oil to heat up the spreader valves and pipes, after previous use.

When handling oil of heavy gravity, more or less of it remains in the pipe and valves, and when such valves are extended from the distributing pipe, the oil will solidify and cause considerable trouble when the device is to be used again, in getting the valves, and oil contained in them, hot enough to allow the full and uniform flow of the oil.

My invention has for an object the overcoming of these difficulties, in the manner hereinafter specified, by the provision of a new and improved valve mechanism.

There are several specific improvements which I wish to call particular attention to; and a preferred form of mechanism embodying these improvements is set forth in the following specification, reference being had to the accompanying drawings, in which for the purpose of this specification, I illustrate a preferred form of mechanism embodying my invention; and in which drawings, Figure 1 is a rear view showing a road oiling device equipped with my invention, Fig. 2 is an enlarged detail section taken on line 2—2 of Fig. 1, Fig. 3 is a plan showing those parts which are shown in Fig. 2 (without the oil spraying nozzle), Fig. 4 is a section taken as indicated by line 4—4 on Fig. 1, and Fig. 5 is a plan taken as indicated by line 5—5 on Fig. 1.

In the drawings the numeral 10 designates a tank or other suitable receptacle in which heated road oil is carried. Such a tank is usually carried on an automobile, and all the various other appliances, such as the pump 11, etc., are also carried on the automobile. The usual arrangements are shown for circulating the oil through, and supplying it under pressure to the distributing or spreader pipe 16. The pump 11 takes oil from the tank, as through pipe 12, and pumps it out under pressure through a pipe 13. The pump may be of any desired character, of a design proper for raising sufficient pressure upon the oil which is delivered through the pipe 13. From the pipe 13 the oil passes into a circulating pipe 14 and thence, through connection 15, into the spreader pipe 16 and thence out through the various valved outlets 17. These outlets are hereinafter described. For the purpose of circulating hot oil in the spreader pipe 16 (to remove any cold oil which has been standing in the pipe, and to warm up the valves and the outlet devices) I provide the circulating system shown in Fig. 1. At the end of the spreader pipe 16 I provide another connection 15ª which connects with the end of the pipe 14; so that the pipes 14 and 16 and the connections 15 and 15ª form a complete circulatory system. From the pipe 14 there is a connection 18, controlled by valve 19, leading back from the tank 10; and there is a valve 20 in the pipe 14 between the connections of the pipe 13 and 18 thereto.

After oil stands for a certain length of time in the spreader pipe 16, it becomes cooled and may partially solidify and set about the valve openings and clog them so that they may not properly operate. Upon subsequent distribution of the oil I first circulate hot oil from the tank through the pipe 16; and this is done by opening the valve 19 and closing the valve 20; the pump 11 then pumping oil from the tank around through pipe 16 and back to the tank again. When the pipe 16 and its valves have been sufficiently warmed, then the valve 19 may be closed and valve 20 opened; when the pump 11 will pump directly to the pipe 16 at both ends of the pipe; and the oil will find exit through the various distribution or spreader openings.

The foregoing is a description of the usual and ordinary construction and operation.

The novel features and elements of my invention are now described, as follows: It is one of the features of my invention that I provide a valve device which is placed within the pipe in such a manner that when hot oil is pumped through the pipe 16, the valves are in direct contact with the hot oil and are heated thereby so that there is no opportunity for oil to cool and clog the valve. In other words, while the device is in operation the valves are immediately in a body of heated oil. This is in contra-distinction to the ordinary form of road oiling devices wherein the valves are usually exterior of the pipe where they cool off very readily and where the oil remaining in the valves cools off and clogs the valves. And it is sometimes very difficult to sufficiently heat such exterior valves to cause the clogged oil to flow again through them.

I may use any suitable number of outlets in order to efficiently and properly spread the oil; and these outlets may have spreading nozzles of any desired character. In the drawings I have illustrated two different forms of nozzles that I use, as at 30 and 30ª. The form illustrated at 30 comprises a horizontal barrel 31 having a passage 32 through which the oil is forced; and at the end of this passage there is a port 33 adapted to be varied in size by the movement of the head 34 mounted on the inner end of a stem 35. The stem 35 connects at 36 with a screw threaded adjustment member 37 which is screw threaded upon a sleeve 38. This form of nozzle, or any other suitable form, may be used in connection with my invention. The form shown at 30ª is merely a plain head with an outlet opening of any suitable size and shape.

Each of the distributing outlets is controlled by a valve device 17. Each of these valve devices embodies a body 40 extending across the interior of the pipe 16, being preferably screw threaded at 41 and 42 into the opposite walls of the pipe. This body 40 has a conical valve bore in which a hollow conical valve 44 is adapted to seat. The body has ports 45 with which ports 46 of the valve 44 are adapted to register. When the ports are in register, the oil under pressure passes through the ports into the hollow interior of the valve 44 and thence downwardly into the connection 47 which leads to the nozzle.

Valve 44 has a stem 48 which extends upwardly through the body 40 and carries, rigidly affixed thereto at its upper end, a valve arm 49. A small spring 50 is confined under this valve arm and tends to raise the valve 44 into tight engagement in the bore 43; and this spring also tends to lift the arm 49 off the hub 51 of the valve operating arm 52; so that there is no frictional contact between the two arms tending to move the arm 49 when the arm 52 is moved. My mechanism for connecting arms 49 and 52 is shown in Figs. 2 and 3. A small yoke 53 with two extending lugs 54 is pivoted at 55 to the valve arm 49. When the yoke is in the position illustrated in Fig. 2 the two lugs 54 engage one on each side of the valve operating arm 52; and when the yoke is thrown back in the direction indicated by the arrow in Fig. 2 the lugs are thrown out of engagement with the valve operating arm 52. The valve operating arm is mounted with its hub around the upper end of body 40 of the valve.

The outer ends of all the valve operating arms 52 are connected to an operating bar or rod 56, so that all of the arms 52 may be operated in unison. The bar 56 may be moved in any suitable manner by the operator on the rear end of the oil distributing device; in instance, I have shown in Figs. 4 and 5 a preferred form of means for moving bar 56. A clamp 60 surrounds the pipe 16 and a lever 61 is mounted thereon; said lever having a handle arm 62 and an arm 63 connected with the bar 56. When all the valve arms are connected to their respective operating arms 52, then all of the valves will be operated in unison and oil will be uniformly distributed through all of the spreader nozzles. However, there are conditions in which it is desired to shut off some of the valves and leave others to be operated to allow flow of oil therefrom. For instance, it may be desired to oil a strip of roadway narrower than the entire width of the complete oiling device; in which case a part of the valves may be easily disconnected from their operating arms 62 and left in closed position, while the other valves may be operated to properly oil a narrow strip.

From the foregoing description the nature of my invention may be understood. I wish to particularly point out the fact that the valve mechanism is the essential element in my invention and that the other arrangements, which are in themselves old, are herein set forth to clearly show the function and utility of my valve mechanism.

Having described a preferred form of my invention, I claim:

1. In a device of the character described, a distributing pipe, and a plurality of outlet valves each including a hollow ported valve body extending across the interior of the distributing pipe and a valve plug in said body with a stem projecting exterior of the pipe, and means to move said valve stem embodying an arm rigidly mounted on the stem, an arm movable adjacent said stem arm, and means to connect said arms and means to circulate hot oil through said pipe and around said valves, said means comprising means to supply oil under pressure to the pipe.

2. In a device of the character described, a distributing pipe, and a plurality of outlet valves each including a hollow ported valve body extending across the interior of the distributing pipe, and a rotatable valve plug in said body with a stem projecting exterior of the pipe, an arm rigidly mounted on said stem exterior of the pipe, an arm loosely mounted around the stem, and disconnectible means to connect said arms and means to circulate hot oil through said pipe and around said valves, said means comprising means to supply oil under pressure to the pipe.

3. In an oil distributing device, a distributing pipe, a plurality of outlet valves for said pipe, each valve embodying a hollow ported valve body interior of the pipe, and means to circulate hot oil through said pipe and around said valves, said means comprising means to supply oil under pressure to the pipe.

4. In a device of the character described, a distributing pipe, a plurality of outlet valves therefor, valve stems for said valves, operating arms loosely mounted around the valve stems, means for moving said arms in unison, arms rigidly mounted on the valve stems, and disconnectible means for connecting the stem arms and operating arms so that any one or more of said valves may be rendered inoperative.

5. In an oil distributing device, a distributing pipe, a plurality of outlet valves for said pipe, each valve embodying a hollow ported valve body interior of the pipe, a means for circulating hot oil through the pipe and for supplying oil under pressure thereto, embodying a pump, a pipe leading from the delivery side of the pump to one end of the distributing pipe, another pipe with a valve therein leading from the other end of the distributing pipe and communicating with the intake side of the pump, and a connecting pipe with a valve between the two aforementioned pipes which lead to and from the ends of the distributing pipe.

6. In a device of the character described, a valve embodying a body having an internal conical bore and ports communicating therewith from the body exterior, large and small screw-threaded portions at opposite ends of the body adapted to fit into corresponding apertures in opposite walls of a pipe, a conical valve plug in said bore having a stem projecting out through the smaller end of the body, a valve arm rigidly affixed to the valve stem, a spring under the arm around the stem resting on the body, an operating arm rotatively mounted on the body beneath the valve stem arm, and disconnectible means to connect the two arms for common movement.

7. In a device of the character described, a distributing pipe, an outlet valve for the pipe embodying a hollow ported valve body interior of the pipe and smaller than the interior of the pipe so as to leave a free passage for fluid through the pipe around the valve, and means to circulate hot fluid through said pipe and around the valve, said means embodying means to supply fluid under pressure to the pipe.

In witness that I claim the foregoing I have hereunto subscribed my name this 28th day of June 1915.

E. L. MILLS.

Witnesses:
   JAMES T. BARKELEW,
   ELWOOD H. BARKELEW.